(12) United States Patent
Fink

(10) Patent No.: US 10,061,413 B2
(45) Date of Patent: Aug. 28, 2018

(54) OPERATING ELEMENT

(71) Applicant: Dr. Ing. h.c. F. Porsche Aktiengesellschaft, Stuttgart (DE)

(72) Inventor: Thomas Fink, Illingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 275 days.

(21) Appl. No.: 14/177,792

(22) Filed: Feb. 11, 2014

(65) Prior Publication Data

US 2014/0225865 A1 Aug. 14, 2014

(30) Foreign Application Priority Data

Feb. 12, 2013 (DE) .................. 10 2013 101 339

(51) Int. Cl.
*G06F 3/041* (2006.01)
*G06F 17/00* (2006.01)
*G06F 3/044* (2006.01)
*G06F 3/0354* (2013.01)

(52) U.S. Cl.
CPC .......... *G06F 3/041* (2013.01); *G06F 3/03547* (2013.01); *G06F 3/044* (2013.01)

(58) Field of Classification Search
CPC ................................. G06F 3/033; G06F 3/041
USPC ......................................................... 345/174
See application file for complete search history.

(56) References Cited

U.S. PATENT DOCUMENTS

| 5,483,261 A | 1/1996 | Yasutake | |
| 2006/0197750 A1* | 9/2006 | Kerr | G06F 1/1626 345/173 |
| 2006/0250353 A1* | 11/2006 | Yasutake | G06F 3/0338 345/156 |
| 2009/0184936 A1* | 7/2009 | Algreatly | G06F 3/03547 345/173 |
| 2010/0097325 A1* | 4/2010 | Nagao | B62K 11/14 345/173 |

(Continued)

FOREIGN PATENT DOCUMENTS

| CN | 101430619 A | 5/2009 |
| DE | 19645211 A1 | 5/1998 |

(Continued)

OTHER PUBLICATIONS

Korean Office Action, dated Feb. 26, 2015, corresponding to counterpart Korean Patent Application No. 10-2014-14352.

(Continued)

*Primary Examiner* — Kent Chang
*Assistant Examiner* — William Lu
(74) *Attorney, Agent, or Firm* — RatnerPrestia

(57) ABSTRACT

An operating element which is cylindrical and has two touch panels with touch-sensitive surfaces, the touch panels being arranged on two outer sides of the operating element which face away from one another, an operating command being able to be input by touching the surfaces of both touch panels, a first focal point for touch being able to be detected on a first touch panel and a second focal point for touch being able to be detected on the second touch panel, and a direction associated with the operating command being able to be dynamically determined by the focal points of the touching of the surfaces of the two touch panels.

15 Claims, 2 Drawing Sheets

(56) References Cited

U.S. PATENT DOCUMENTS

| | | | | |
|---|---|---|---|---|
| 2010/0229611 A1* | 9/2010 | Konno | ..................... | B62H 5/02 |
| | | | | 70/252 |
| 2011/0178679 A1* | 7/2011 | Monig | .............. | B60R 25/02147 |
| | | | | 701/41 |
| 2012/0262393 A1* | 10/2012 | Yokoyama | .......... | G06F 3/03547 |
| | | | | 345/173 |
| 2013/0054065 A1* | 2/2013 | Komatsu | .................. | B62M 6/45 |
| | | | | 701/22 |
| 2013/0151073 A1* | 6/2013 | Tetsuka | .................. | B62M 25/04 |
| | | | | 701/37 |
| 2014/0069015 A1* | 3/2014 | Salter | ...................... | E05B 81/76 |
| | | | | 49/31 |
| 2014/0293053 A1* | 10/2014 | Chuang | ................ | A61B 5/6893 |
| | | | | 348/148 |

FOREIGN PATENT DOCUMENTS

| | | |
|---|---|---|
| KR | 20100044770 A | 4/2010 |
| KR | 20110026960 A | 3/2011 |
| WO | WO 2006/020305 A2 | 2/2006 |

OTHER PUBLICATIONS

German Search Report, dated Sep. 11, 2013, corresponding to German counterpart Patent Application No. 10 2013 101 339.2, with partial English translation.

* cited by examiner

OPERATING ELEMENT

CROSS-REFERENCE TO RELATED APPLICATIONS

This application claims priority to German Patent Application No. 10 2013 101 339.2, filed Feb. 12, 2013, which is incorporated by reference herein in its entirety.

FIELD OF THE INVENTION

The present invention relates to an operating element and to a method for inputting an operating command.

BACKGROUND OF THE INVENTION

An operating element for inputting an operating command may be in the form of a man-machine interface which can be operated by means of manual actuation, for example. In this case, touching of the operating element can be spatially detected and evaluated, thus providing an operating command.

An input device is described in the document US 2009/0184936 A1, which is incorporated by reference herein, and comprises a cube-shaped module having touch panels on three directly adjacent sides, each of these sides being oriented in one of the three spatial directions. These touch panels can be operated at the same time. It is thus possible to move a mouse pointer in three spatial directions.

A similar input device having a cube-shaped module on whose sides touch panels are arranged is known from the document U.S. Pat. No. 5,483,261, which is incorporated by reference herein. Said document also describes how manual inputs can be displayed on a monitor of a computer.

The document CN 101430619, which is incorporated by reference herein, describes an integrated control system having two sensor areas which are arranged beside one another in the same plane and have different functions. In this case, a first sensor area is combined with a display panel for displaying an object. A second sensor area is used to detect a gesture of a user, as a result of which manipulation, e.g. displacement, of the displayed object can be input to the control system.

SUMMARY OF THE INVENTION

Against this background, an operating element and a method having the features of the independent patent claims are presented. Further advantages and refinements of the invention emerge from the respective dependent patent claims and the description.

The operating element, generally a body of this operating element, is cylindrical and therefore dome-like in one possible refinement and may have an elliptical, e.g. circular, cross section. A virtual main axis, for example an axis of symmetry, which is in a plane of the cross section and runs through a center of the cross section is also provided for the operating element. If the cross section of the cylindrical operating element is elliptical, provision may be made for the virtual main axis to correspond to one of the two possible half-axes of the elliptical cross section. In this case, two touch panels are arranged, as surface elements, on two outer sides of an outer wall of the operating element which face away from one another and are virtually delimited from one another by the virtual main axis provided, which touch panels can be actuated by means of manual touch. Therefore, depending on the definition of the virtual main axis, the two outer sides are spatially separated from one another or delimited from one another by the virtual main axis. The touch panels of the operating element can be used to detect gestures using sensor technology.

Therefore, two spatially resolving capacitive touch panels which are opposite one another and can also be referred to as contact sensors or touch sensors may be integrated on the outer wall of the operating element or the body of the latter on the two outer sides which face away from one another.

Touching of the two touch panels is evaluated with respect to its area, that is to say the area which is respectively touched (also respectively referred to as a "touched" area below), and a focal point of such a touched area. In order to implement an operating command, each touch panel must be simultaneously touched by at least one finger. A size of an area touched by a finger depends on how strongly the finger is pressed onto the touch panel. The area is generally larger, the more strongly the finger is pressed since the touching finger is deformed to a greater extent, the more strongly it is pressed onto the touch panel, in which case the area of a fingertip of the touching finger, which rests on the touch panel, accordingly becomes larger.

If a touch panel is touched by a plurality of fingers, the size of the entire area touched by the fingers depends on how strongly each individual one of these fingers is pressed onto the touch panel, in which case the entire touched area results from the sum of the touched areas for all fingers.

Furthermore, in addition to a size of the touched area, it is possible to determine, for each touch panel when touched, a focal point on a surface of the touch panel, which focal point results from the touching and on which the greatest force and/or the greatest pressure is exerted during touching.

The touch panels arranged on the outer sides may have a three-dimensional shape and may therefore be convexly bent or curved, for example.

In a refinement of the method, it is possible to use known algorithms, on the basis of which areas of touch can be calculated and their respective focal points can be determined by means of calculation, such algorithms also being used in a similar manner to detect gestures of so-called touch panels. Within the scope of the method, it is therefore possible to verify intended touching and to derive forces therefrom which are used to touch and therefore actuate the touch panels.

Touching of each of the touch panels is capacitively evaluated by measuring and/or determining a touch capacitance. When the surface of a touch panel is touched, a control unit determines, for each touching finger, that area in which a value for a measurement variable recorded by the touch panel using sensor technology exceeds a signal threshold. This area then corresponds to the touched area described above. If a touch capacitance is recorded as the measurement variable using sensor technology, a check is carried out in order to determine whether a signal threshold $\Delta C$ defined for this purpose is exceeded. In addition, when the surface of the touch panel is touched, the control unit determines the focal point of this touched area.

If the surface has only a virtually miniscule friction value or coefficient of friction, as is the case in display surfaces of smart phones for example, and if an operating person exerts a laterally shifting force, for example, on the surface using at least one finger, the finger is shifted over the surface of the touch panel. However, since the surface of a touch panel is curved according to the invention and has a friction value or coefficient of friction which exceeds a particular minimum value, slipping of a finger from the touch panel is prevented in the operating element according to the invention since the surface of the touch panel is now non-slip. In this case, introduction of force by means of at least one finger results, on account of a resilient nature of the at least one finger, in a slight displacement of the focal point of touch or of the touched area from a first focal point S1 to a second focal point S2. At the same time, an area acted upon when touched by the at least one finger, that is to say a touched area, is changed from a first touched area A1 to a second touched area A2 by an area difference ΔA, that is to say is increased or reduced by a magnitude of the area difference ΔA. In this case, a change in the area can be recorded only when the area difference ΔA has a minimum value. As a result of this measure according to the invention, a location-sensitive touch panel becomes a force-sensitive touch panel or a location-sensitive and force-sensitive touch panel.

Depending on a shape of the outer sides of the operating element, the operating element should be acted on and therefore operated by at least two fingers, which are largely opposite one another, on both touch panels in order to implement an operating command, actuating forces exerted by the fingers occurring largely at the same time and displacing the respective focal points of the respectively touched areas of the two touch panels in the same direction or in opposite directions depending on the actuating direction. Since an operating command is produced only when both touch panels are touched at the same time, touching of only one of the two touch panels on only one side, which may possibly be unintentional, is rejected.

In one refinement, a first sensory touch panel L of the operating element is arranged on the left, that is to say in the direction of travel, usually in the forward direction of travel of the motor vehicle, on the left-hand outer side of the operating element to the left of the virtual main axis, whereas a second sensory touch panel R is arranged opposite on the right and therefore on the right-hand outer side of the operating element to the right of the virtual main axis in the direction of travel.

In table 1 below, a "+" denotes an area A1 which has already been touched on one of the two touch panels L, R and which is increased to the area A2 by an area difference ΔA if touching is currently continued. A "−" denotes an area A1 which has already been touched on one of the two touch panels L, R and is reduced to an area A2 by the area difference ΔA if touching is currently continued, in which case at least the first area A1 is or was at least as large as a minimum area $A_{min}$ before the decrease. In this case, provision may be made for the area difference ΔA to exceed a minimum threshold or a minimum value. If the area difference ΔA exceeds the minimum threshold provided for this purpose, a desired introduction of force is recorded for the touching, from which a specific operating command can be derived if both touch panels L, R are touched substantially at the same time in a recordable manner.

The usually local prepositions "forward", "back", "high", "low" and "without" which are additionally stated in table 1 also define a recorded movement of a focal point of a touched area of a touch panel L, R relative to the motor vehicle if the focal point of the touched area is displaced by at least a predefined minimum distance ΔS. In the embodiment presented, the preposition "forward" defines an introduction of force in the forward direction of travel parallel to the longitudinal axis of the motor vehicle and therefore a corresponding displacement of the focal point. The preposition "back" defines an introduction of force in the reverse direction of travel which is opposite the forward direction of travel. The preposition "high" defines an introduction of force directed upward perpendicular to the forward direction of travel and the preposition "low" defines an introduction of force directed downward perpendicular to the forward direction of travel. The prepositions can be used to define a movement of the corresponding focal point.

An operating command and a movement effected with the latter can then be derived from a combination of the recordable touching of both touch panels L, R, that is to say of the left-hand touch panel L and of the right-hand touch panel R, as can be gathered from table 1.

TABLE 1

| | Touch panel L | Touch panel R | Movement associated with an operating command to be derived |
|---|---|---|---|
| (1) | +, forward | +, forward | forward |
| (2) | +, back | +, back | back |
| (3) | +, high | +, high | high |
| (4) | +, low | +, low | low |
| (5) | +, without | −, without | to the right |
| (6) | −, without | +, without | to the left |
| (7) | +, forward | +, back | turning to the right |
| (8) | +, back | +, forward | turning to the left |
| (9) | +, high | +, low | inclination to the right |
| (10) | +, low | +, high | inclination to the left |

In detail, table 1 presents, by way of example, ten different operating commands (1), (2), (3), (4), (5), (6), (7), (8), (9), (10) and movements for these operating commands (1), (2), (3), (4), (5), (6), (7), (8), (9), (10). In the case of a first operating command (1), both focal points of the two touched areas on both touch panels L, R are simultaneously moved forward in this case in the intended forward direction of travel of the motor vehicle. An axis which runs through the two focal points and is here then oriented perpendicular to the forward direction of travel is displaced forward parallel to the forward direction of travel in this case. In the case of the second operating command (2), both focal points and the axis running through the two focal points are accordingly displaced backward counter to the forward direction of travel. Movements in the horizontal direction based on the motor vehicle are usually described by the two operating commands (1), (2) described above.

The third operating command (3) and the fourth operating command (4) can be used to predefine movements in the vertical direction based on the motor vehicle. In the case of the third operating command (3), both focal points are simultaneously displaced upward in this case, the axis which runs through the two focal points also being displaced upward. In contrast, in the case of the fourth operating command (4), both focal points are simultaneously displaced downward. The axis running through the two focal points is therefore also displaced downward.

In the case of the fifth and sixth operating commands (5), (6), the positions of both focal points remain unchanged. However, the touched areas on the two touch panels L, R are changed by changing forces and/or pressures which act on the respective focal points which do not move here. In the case of the fifth and sixth operating commands (5), (6), a position of the axis running through the two focal points remains unchanged. However, in the case of the fifth operating command (5), a greater pressure is applied to the focal point on the left-hand touch panel L, associated with an increase in the area, than on the focal point on the right-hand touch panel R. In this case, the fifth operating command (5) is used to define a movement which is oriented to the right perpendicular to the forward direction of travel. In the case of the sixth operating command (6), in contrast to the fifth operating command (5), a movement to the left perpendicular to the forward direction of travel is defined since a greater pressure is applied to the right-hand touch panel R than the left-hand touch panel L here, which can be discerned/recorded using the increasing touched area of the right-hand touch panel R. This also corresponds to the fact that a greater force and/or a higher pressure is exerted on the focal point of the right-hand touch panel R than on the focal point of the left-hand touch panel L.

The seventh and eighth operating commands (7), (8) can be used to define, as movements, turning in a horizontal plane relative to the forward direction of travel of the motor vehicle. In this case, provision is made for the focal point on the left-hand touch panel L to be moved forward and for the focal point on the right-hand touch panel R to be moved backward in the case of the seventh operating command (7). In this case, the axis running through the two focal points is turned to the right in the clockwise direction relative to the forward direction of travel. In the opposite situation, in the case of the eighth operating command (8), the focal point on the left-hand touch panel L is moved backward and the focal point on the right-hand touch panel R is simultaneously moved forward. The axis running through the two focal points is accordingly turned to the left in the anticlockwise direction relative to the forward direction of travel.

The ninth and tenth operating commands (9), (10) can be used to define, as movements, inclinations relative to or around the forward direction of travel. In the case of the ninth operating command (9), the focal point on the left-hand touch panel L is moved upward and the focal point on the right-hand touch panel R is moved downward in this case. The axis running through the two focal points is inclined to the right in the clockwise direction around the forward direction of travel in this case. In contrast to the ninth operating command (9), in the case of the tenth operating command (10), the focal point on the left-hand touch panel L is moved downward and the focal point on the right-hand touch panel R is simultaneously moved upward. This simultaneous movement of both focal points can also be used to define an inclination of the axis, which runs through the two focal points, to the left in the anticlockwise direction relative to the forward direction of travel.

In this refinement, if both focal points are acted on to the same extent, with the result that substantially the same pressure and/or the same force act(s) on each focal point and at least one of the two focal points is moved, a movement associated with the operating command to be derived is defined by a relative movement of at least one of the two focal points relative to the body of the operating element and/or to the other of the two focal points. Depending on whether only one of the two focal points or both focal points is/are moved, a direction can be defined by a movement of the axis, which runs through both focal points, relative to the forward direction of travel of the motor vehicle.

In the case of the first four operating commands (1), (2), (3), (4), both focal points are simultaneously moved or displaced in the same direction. The axis running through the two focal points is always moved in the same direction as both focal points in the first four examples of the operating commands (1), (2), (3), (4).

In the case of the fifth and sixth operating commands (5), (6), the two focal points are not moved but the two focal points are acted on or pressed to a different extent. An axis running through the two focal points is also provided in these two examples of operating commands (5), (6). In these two cases, a direction of a movement associated with the respective operating command (5), (6) is changed parallel to the axis.

In the case of the four last-mentioned operating commands (7), (8), (9), (10), provision is respectively made for the two focal points to each be moved in opposite directions. As a result, rotation of the axis running through the two focal points, that is to say turning or inclination of the axis, can be defined.

In this refinement, provision is made for all other touching of the touch panels L, R to be ignored.

Focal points and areas of manual touch are therefore measured and/or detected using the touch panels L, R. The two touch panels L, R can be simultaneously used to provide data or information relating to a plurality of fingers which simultaneously touch the two touch panels L, R. The touch panels L, R can be integrated in the outer sides of the operating element, as examples of free-form areas.

Another refinement takes into account the fact that one of the two touch panels L, R is touched using more than only one finger. This makes it possible to determine the side on which a person operating the operating element, for example, is sitting beside the operating element in a motor vehicle.

If this person is sitting to the left of the operating element and therefore on the driver's side in continental European countries, for example, the touch panel L arranged on the left-hand outer side of the operating element in the direction of travel is operated with the thumb of the right hand and the touch panel R arranged on the right-hand outer side of the operating element in the direction of travel is operated with at least two of the other fingers of the right hand. In contrast, if this person is sitting to the right of the operating element, for example on the passenger side, the touch panel R arranged on the right-hand outer side of the operating element in the direction of travel is operated with the thumb of the left hand and the touch panel L arranged on the left-hand outer side of the operating element in the direction of travel is operated with at least two of the other fingers of the left hand. After the position of the operating person relative to the operating element has been identified, a focal point of touching of that touch panel L, R which has the same characteristic as touching with only one finger, the thumb here, is used and/or taken into account.

As shown in table 2 below using two examples, very sophisticated evaluation of combined touching of both touch panels L, R can be carried out in a further refinement in order to provide operating commands by virtue of respective movements of the respective focal points, if they are respectively moved by a minimum distance ΔS, being characterized in an even more sophisticated manner than in table 1, that is to say by means of further terms, and then being evaluated in combination.

TABLE 2

| | Touch panel L | Touch panel R | Movement associated with an operating command to be derived |
|---|---|---|---|
| (11) | +, strongly forward | +, weakly forward | forward and turning to the right |
| (12) | +, strongly back and low | +, weakly forward and high | back, turning to the left and inclination to the left |

Table 2 consequently describes an eleventh operating command (11) and a twelfth operating command (12). Like in the four last-mentioned operating commands (7), (8), (9), (10), as described using table 1, both focal points are moved differently. In the case of the eleventh operating command (11), the focal point on the left-hand touch panel L is moved forward more strongly than the focal point on the right-hand touch panel R which is not moved forward so strongly. In the case of the twelfth operating command (12), both focal points are moved or displaced to different extents in different directions. However, in both operating commands (11), (12), provision is made for the movement associated with the operating command to be derived to also be defined by a movement of the axis which runs through both focal points. With the eleventh operating command (11), the axis through the two focal points is displaced forward relative to the forward direction of travel and is simultaneously turned to the right in the clockwise direction. In the case of the twelfth operating command (12), the axis running through the two focal points is displaced backward and is turned to the left in the clockwise direction in a horizontal plane relative to the motor vehicle in a manner perpendicular to the forward direction of travel and is simultaneously turned to the left in the clockwise direction in a vertical plane relative to the motor vehicle in a manner perpendicular to the forward direction of travel.

In addition, if interference with respect to electromagnetic compatibility (EMC) is detected, provision can be made for the control unit for the touch panels to detect incorrect operation. In contrast to conventional operating elements with only one area, a plausibility check is easily possible in the described operating element as a result of the requirement for at least one second, corresponding finger. Furthermore, modules for generating oscillations and/or vibrations may be integrated in the operating element, which modules are activated by touch after an operating command has been identified, thus signaling to the operating person that an operating command has been detected. Alternatively or additionally, the operating element may have a luminous module which signals a detected operating command.

The operating element is suitable for generating operating commands on the basis of a few touch actions, which commands can be used to operate complex menus for controlling and/or regulating functions of a motor vehicle.

The operating element described can be intuitively operated in a similar manner to a so-called turn and press actuator but, in comparison with the latter, does not have a complicated mechanism. Unintentional actuation of the operating element, which would usually correspond to actuation in the pressing direction in a turn and press actuator, which could be incorrectly identified by the turn and press actuator as an operating command, is ignored by the operating element according to the invention. In addition, in contrast to the turn and press actuator, the operating element can be integrated in a free-form area, that is to say in a module which is formed as the center console, for example, and has a smooth surface.

With the operating element according to the invention, touching of the first touch panel and touching of the second touch panel by means of at least one finger in each case are combined with one another in order to implement an operating command. Intuitive actuation of the operating element, like in the case of actuation of a knob, can therefore be converted into a resultant operating command. The operating element presented, in which surfaces of the touch panels of the operating element have a minimum friction value, can be used to detect an operating command on the basis of resilience of fingertips, the associated direction or movement of said operating command being equivalent to forces which act on the respective touch panels. The plausibility of a movement associated with the touching of the two touch panels can also be checked.

In contrast, in the input device known from the document US 2009/0184936 A1, which is incorporated by reference herein, touch panels are arranged directly beside one another and are turned through 90° relative to one another. Intuitive input for moving a mouse pointer is not possible here.

In the input device described in the document U.S. Pat. No. 5,483,261, which is incorporated by reference herein, a movement is optically detected. In contrast, in the operating element according to the invention, forces which act on the touch panels during touch can be electromechanically detected since the touch panels, in one refinement, are in the form of spatially resolving, capacitive contact sensors or other touch-sensitive sensors.

Further advantages and refinements of the invention emerge from the description and the accompanying drawing.

It goes without saying that the features mentioned above and the features yet to be explained below can be used not only in the respectively stated combination but also in other combinations or alone without departing from the scope of the present invention.

BRIEF DESCRIPTION OF THE DRAWINGS

The invention is schematically illustrated in the drawing using an embodiment and is described in detail with reference to the drawing.

DETAILED DESCRIPTION OF THE INVENTION

The figures are cohesively and comprehensively described; identical reference symbols denote identical components or variables.

Figure 1:
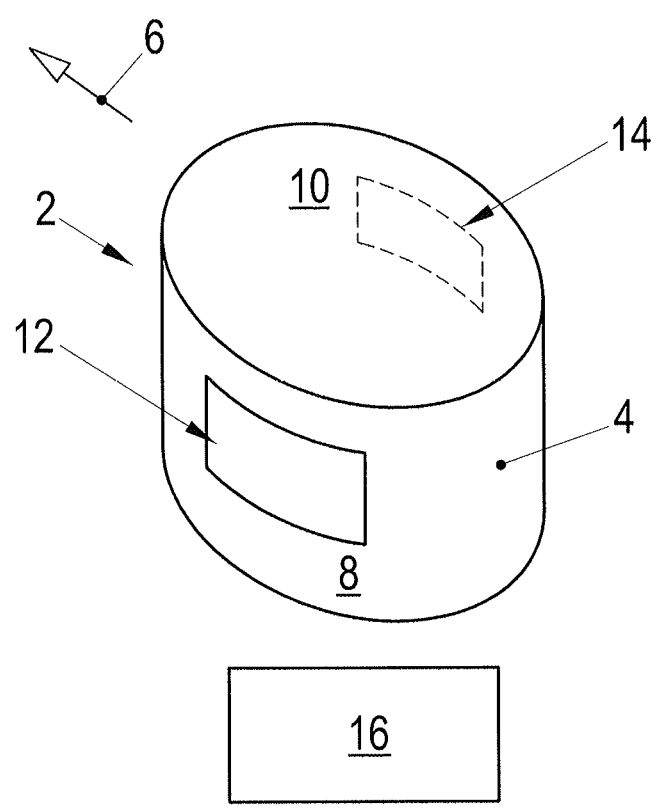
FIG. 1 shows a schematic illustration of a first embodiment of an operating element according to the invention.

The first embodiment of the operating element 2 according to the invention, which is schematically illustrated in FIG. 1, comprises a body with a cylindrical outer wall 4, the body and therefore the operating element 2 having an elliptical cross section.

In this case, provision is made for the cylindrical operating element 2 to be designed to generate usually direction-dependent operating commands for at least one function of a motor vehicle and to be arranged in such a motor vehicle, for example on a center console. In this respect, an orientation of a longitudinal axis, usually in the forward direction of travel, of the motor vehicle is indicated by means of an arrow 6 in FIG. 1. Therefore, a large half-axis of the elliptical cross section is oriented here, as a virtual main axis, through a center of the elliptical cross section of the operating element 2 and/or of the body of the operating element 2 parallel to the longitudinal axis and/or to the forward direction of travel of the motor vehicle, whereas the small half-axis of the elliptical cross section is oriented, as a secondary axis, perpendicular to the longitudinal axis and/or to the forward direction of travel of the motor vehicle.

In addition, a first outer side 8 (at the front left in FIG. 1) and a second outer side 10 (at the rear right in FIG. 1) are defined for the outer wall 4. A first touch-sensitive touch panel 12 is also arranged on the first outer side 8 and a second touch-sensitive touch panel 14 is arranged on the second outer side 10. Each of the two touch panels 12, 14 has a rectangular base area which is convexly bent in the embodiment described here.

In the embodiment described, the outer wall 4 is therefore subdivided into the two outer sides 8, 10, the first outer side 8 extending along a curve of the outer wall 4, which, in this case, is arranged to the left of the large half-axis or virtual main axis. The first touch panel 12 is accordingly arranged along this curve to the left of the large half-axis or virtual main axis. The second outer side 10 extends along the opposite curve of the outer wall 4 which, in this case, is arranged to the right of the large half-axis. The second touch panel 14 is therefore likewise arranged along the curve to the right of the large half-axis or main axis.

If the cylindrical operating element 2 and/or its body has/have a circular cross section in one refinement, an axis of symmetry may likewise be defined, as the virtual main axis, through a center of the cross section, which axis of symmetry is oriented parallel to the forward direction of travel indicated by the arrow 6 and/or parallel to the longitudinal axis of the motor vehicle. In this case, the first touch panel 12 is arranged on the first outer side 8 along a curve to the left of the main axis. The second outer side 10 extends along the opposite curve of the outer wall 4, which, in this case, is arranged to the right of the main axis. The second touch panel 14 is arranged on the second outer side 10 which extends along the curve to the right of the main axis.

The operating element 2 also comprises a control unit 16 which is designed to process signals relating to touch which is detected with the touch panels 12, 14 using sensor technology and to determine a direction of an associated operating command.

The cylindrical operating element 2 therefore comprises two touch panels 12, 14 with touch-sensitive surfaces which are arranged on two outer sides 8, 10 of the operating element 2 which face away from one another. An operating command can be input by simultaneously touching the surfaces of both touch panels 12, 14, in which case each of the two touch panels 12, 14 should be touched by at least one finger. In this case, a first focal point for touch and a first touched area should be or are detected on a first touch panel 12 and a second focal point for touch and a second touched area should be or are detected on the second touch panel 14. An operating command or a direction associated with the operating command is determined by the touch focal points to be detected at the same time on the surfaces of the two touch panels 12, 14 and possibly their respective movements relative to one another in absolute terms.

Furthermore, it is possible to determine and/or measure whether a greater force acts on one of the two focal points than on the other focal point. If the two focal points are acted on to different extents by different forces and/or pressures, the direction to be associated with the operating command can be defined in a more accurate manner.

The cylindrical operating element 2 and/or its body can have an elliptical cross section. In addition, the operating element 2 and/or its body has/have a virtual main axis which is in the plane of the cross section and runs through a center of the cross section of the operating element 2, the two outer sides 8, 10 which are convexly curved to the outside being virtually delimited from one another by the virtual main axis.

In one possible use, the operating element 2 can be arranged in a motor vehicle for which a forward direction of travel is provided. In this case, the virtual main axis of the operating element 2 should be positioned parallel to the forward direction of travel. A first touch panel 12 is therefore arranged on the left-hand outer side 8 in the forward direction of travel and a second touch panel 14 is arranged on the right-hand outer side 10 in the forward direction of travel. This may mean that the two touch panels 12, 14 are arranged substantially parallel to one another and parallel to the intended forward direction of travel of the motor vehicle.

The operating element 2 which is provided for a motor vehicle is designed to input direction-dependent operating commands for the motor vehicle.

The touch panels 12, 14 are in the form of spatially resolving capacitive contact sensors. In addition, the surfaces of the touch panels 12, 14 are non-slip, that is to say the respective surfaces have a coefficient of friction which exceeds a particular minimum.

During the method, when the surface of a touch panel 12, 14 is touched, a focal point of a touched area and a size of the touched area are determined. It is also determined whether and to what extent a respective focal point of the respectively touched area of the two touch panels is displaced by respectively continued touching and/or the size of the respectively touched area is increased and/or reduced. The resulting results of the touching of the two touch panels are combined with one another, from which an operating command is derived. The two touch panels 12, 14 are generally touched with fingers of one hand.

Furthermore, when both touch panels 12, 14 are touched at the same time, an axis running through the focal point on the first touch panel 12 and through the focal point on the second touch panel 14 is taken into account.

In this case, it is detected whether at least one of the two focal points is displaced, that is to say only one focal point is moved relative to the body of the operating element 2, or whether both focal points are moved relative to the body of the operating element 2 at the same time. If at least one of the two focal points is moved, the axis running through the two focal points is simultaneously moved relative to the body of the operating element 2 and therefore also relative to the forward direction of travel of the motor vehicle. Such a movement of the axis, which results from a movement of at least one focal point of the two focal points, may comprise displacement of the axis and/or rotation, that is to say turning or inclination of the axis relative to the forward direction of travel.

Alternatively or additionally, it is taken into account on which of the two focal points a greater force and/or a greater pressure is/are exerted. If neither of the two focal points is moved but a greater force is applied to one of the two focal points, a direction of the operating command to be derived therefrom runs parallel to the axis running through the two focal points, to be precise in the direction of that focal point on which a recordable greater force is exerted. Furthermore, at least one of the two focal points on at least one of the touch panels 12, 14 can also be moved. If at least one of the two focal points is moved, a direction associated with the operating command is dynamically changed since a position of the at least one focal point of the two focal points, which is used to define the direction within the scope of the method, is changed. In this case, the at least one focal point, during touching, is moved along a rectilinear and/or curved path on a corresponding touch panel 12, 14 of the elliptical cylinder of the operating element 2. Furthermore, the axis through the two focal points is also moved, that is to say displaced and/or rotated, as a result.

In addition, that area on which a force which is greater than a minimum force acts and/or a pressure which is greater than a minimum pressure acts during touching, usually by at least one finger, is detected as the touched area. In this case, a check can also be carried out in order to determine the touch panel on which a larger area is touched. In addition, the size of at least one area can be changed, in which case and/or as a result of which the direction associated with the operating command can be additionally dynamically changed.

If a size of the at least one area is changed, this is either increased or reduced by an area difference ΔA for the area. A direction relative to the forward direction of the motor vehicle, in which the at least one area is changed by the area difference ΔA, is used to derive the direction around which the operating command is changed, in which case the first area with the first focal point which is touched on the first touch panel and the second area with the second focal point which is touched on the second touch panel need to be taken into account.

The method can be carried out using the operating element arranged in a motor vehicle, the direction associated with the operating command being defined relative to a forward direction of travel of the motor vehicle irrespective of whether or not this direction is changed by movement of at least one of the two focal points. In this case, an angle of a direction associated with the operating command can be defined relative to the forward direction of travel of the motor vehicle in one refinement.

Figure 2:
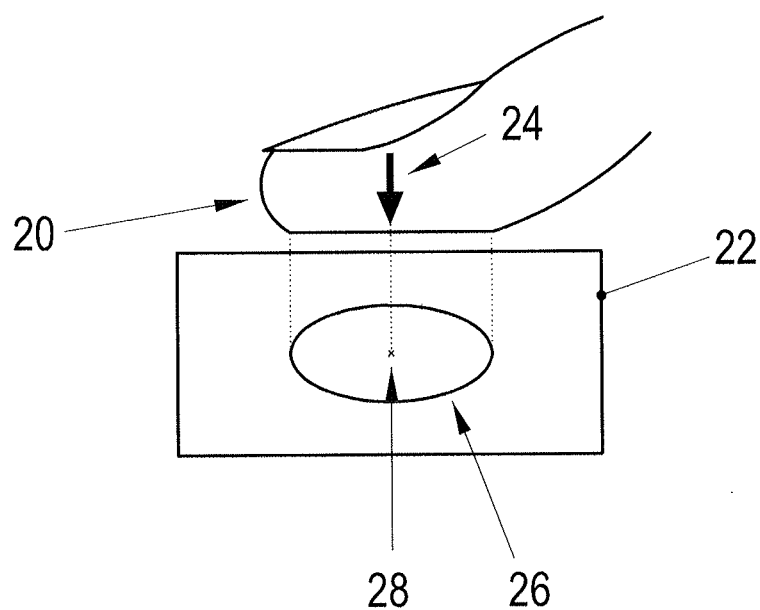
FIG. 2 shows a schematic illustration of a first situation in which an operating command is input by touching a touch panel of a second embodiment of an operating element according to the invention.
Figure 3:
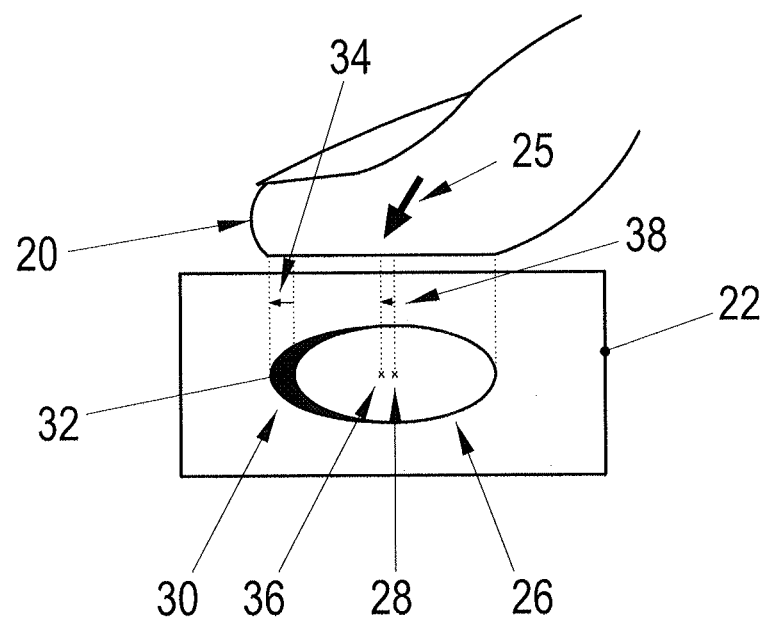
FIG. 3 shows a schematic illustration of a second situation which follows the first situation from FIG. 2 and in which the operating command is input by touching the touch panel of the second embodiment of the operating element according to the invention.

FIGS. 2 and 3 each show a finger 20 when touching one touch panel 22 of two touch panels of a second embodiment (not illustrated any further) of the operating element according to the invention, these two touch panels also being arranged on two outer sides of the operating element which face away from one another. In this case, the touch panel 22 in the first situation (FIG. 2), when touched with the finger 20, is actuated and/or acted on with a first force by the finger 20, which force is indicated in FIG. 2 by a first vector arrow 24, a direction of the force acting perpendicular to a surface of the operating panel. In the second situation which is presented using FIG. 3 and directly follows the first situation, the touch panel 22 is actuated and/or acted on with a second force by the finger 20 when touched, here when the touching from FIG. 2 is continued over time, said force being indicated in FIG. 3 by a second vector arrow 25. In this case, a direction of the force is now inclined with respect to the surface and is increased or intensified in comparison with the first situation, which is also indicated by the two vector arrows 24, 25 which have different orientations and different lengths.

In this case, a first area 26 A1 is touched by the finger 20 in the first situation. A first focal point 28 S1 of the first area 26 A1 which is detected in this case and on which the greatest force and/or the greatest pressure act(s) during touching is likewise illustrated in FIG. 2. In the second situation, the touch panel 22 is touched by the finger 20 on a second area 30 A2 which is larger than the first area 26 A1 by an area difference 32 ΔA. A resultant increase in the first area 26 A1 to the second area 30 A2 is indicated by an arrow 34 in FIG. 3. FIG. 3 also shows a second detected focal point 36 S2 of the second area 30 A2 on which the greatest force and/or the greatest pressure act(s) during touching. This second focal point 36 S2 has been displaced in comparison with the first focal point 28 S1, as indicated by an arrow 38. If the corresponding second touch panel (not shown here) is likewise touched in a recordable manner, the practice of displacing and/or moving the first focal point 28 S1 to the second focal point 36 S2 dynamically defines a direction associated with the operating command. In this case, a position and/or movement of the focal point of the touched area on the second touch panel (not shown here) should be taken into account since the direction associated with the operating command is defined by both focal points, that is to say the focal point 28 or 36 on the first touch panel 22 shown here and the further focal point on the second touch panel (not illustrated here).

In both situations, a signal threshold for a value of a measurement variable recorded by the touch panel 22 using sensor technology is exceeded. This also means that an intended minimum force and/or an intended minimum pressure act(s) on both areas 26, 30 A1, A2. Touching of the touch panel 22 is recorded as such and is used to define an operating command only when the force respectively acting on one of the areas 26, 30 A1, A2 exceeds the definable minimum force and/or the pressure acting thereon exceeds the definable minimum pressure.

The touching described using the two FIGS. 2 and 3 is dynamic on account of the change in the size of the first area 26 A1 to the size of the second area 30 A2 and on account of the change in a position of the first focal point 28 S1 to a position of the second focal point 36 S2 on a surface of the touch panel 22. Taking into account the changing areas 26, 30 A1, A2, as indicated by the arrow 34, and/or the focal points 28, 36 S1, S2, as indicated by the arrow 38, it is possible to detect a movement of the touch by the finger 20 and to dynamically define an operating command based thereon if the corresponding second touch panel (not shown here) is likewise touched in a recordable manner.

In order to determine how a direction of the area touched by the finger 20 changes, it is determined how the first area 26 A1 and the second area 30 A2 are spatially positioned relative to one another.

In order to determine a direction associated with an operating command, it is therefore necessary to take into account how at least one of the two focal points on one of the two touch panels moves relative to the body of the operating element and/or to the forward direction of travel of the motor vehicle. Alternatively or additionally, it is also possible to take into account the extent to which the two focal points are acted on differently. For this purpose, in one refinement, it is detected whether a greater pressure or greater force is exerted on one of the two focal points than on the other of the two focal points. If at least one of the two focal points is moved, which can also mean that both focal points are moved at the same time, an axis which runs through both focal points and the position of which in space is defined by positions of both focal points on both touch panels is defined for the purpose of determining the direction for the operating command. If at least one of the two focal points is moved, this means that the axis is also moved in space, the axis being displaced and/or rotated, that is to say turned or inclined, in space. If the two focal points are acted on to different extents during touching, an additional movement parallel to the axis is additionally defined, which movement is superimposed on a movement of the axis in space resulting from a movement of at least one of the two focal points.

What is claimed is:
1. An operating element which is cylindrical or elliptical and has two discrete touch panels with touch-sensitive surfaces, the touch panels being arranged on two outer sides of the operating element which face away from one another, an operating command being able to be input by simultaneously touching the surfaces of both touch panels, wherein no operating command can be input if only one of the touch panels of the two discrete touch panels is touched, a first focal point for touch being able to be detected on a first touch panel and a second focal point for touch being able to be detected on the second touch panel, and a single direction associated with the operating command being able to be dynamically determined by comparing the detected focal points of the two touch panels resulting from the simultaneous touching of the surfaces of the two touch panels, wherein the operating element is configured to be arranged in a motor vehicle for which a forward direction of travel is provided, wherein a virtual main axis of the operating element, which runs through a center of the operating element, is positioned parallel to the forward direction of travel.

2. The operating element as claimed in claim 1, in which the two touch panels are arranged on two opposite outer sides of the operating element and the surfaces of the two touch panels are oriented in different directions.

3. The operating element as claimed in claim 1, in which each touch panel is rectangular.

4. The operating element as claimed in claim 1, in which the surfaces of both touch panels are convexly curved.

5. The operating element as claimed in claim 1, which has a body with outer sides on which the touch panels are arranged.

6. The operating element as claimed in claim 1, which has an elliptical cross section.

7. The operating element as claimed in claim 6, in which the elliptical cross section has the virtual main axis which runs through the center of the operating element, the two outer sides being virtually delimited from one another by the main axis.

8. The operating element as claimed in claim 1, in which the touch panels are in the form of spatially resolving capacitive contact sensors.

9. The operating element as claimed in claim 1, in which the surfaces of the touch panels have a coefficient of friction which exceeds a predetermined minimum value.

10. A method for inputting an operating command using a cylindrical or elliptical operating element which has two discrete touch panels with touch-sensitive surfaces, the touch panels being arranged on two outer sides of the operating element which face away from one another, the operating command being input by simultaneously touching the surfaces of both touch panels, a first focal point for touch being detected on a first touch panel and a second focal point for touch being detected on the second touch panel, and a single direction associated with the operating command being dynamically determined by comparing the detected focal points of the two touch panels resulting from the simultaneous touching of the surfaces of the two touch panels, and any operating command being rejected if only one touch panel of the two discrete touch panels is touched, the method further comprising determining a direction associated with the operating command relative to a forward direction of travel of a motor vehicle.

11. The method as claimed in claim 10, in which a maximum force is exerted on the focal point with the corresponding touching.

12. The method as claimed in claim 11, in which a distinction is made regarding the focal point of one of the two touch panels on which a greater force acts.

13. The method as claimed in claim 10, in which a focal point is moved on the surface of at least one touch panel, the direction associated with the operating command being dynamically changed.

14. The method as claimed in claim 10, in which a size of an area of touch on the surface of at least one touch panel is determined.

15. The method as claimed in claim 14, in which the size of at least one touched area on the surface of at least one touch panel is changed.

* * * * *